United States Patent [19]
Graham

[11] Patent Number: 5,971,021
[45] Date of Patent: Oct. 26, 1999

[54] METHOD AND VALVE FOR FILLING FLUID SYSTEM

[75] Inventor: Robert W. Graham, Janesville, Wis.

[73] Assignee: SSI Technologies, Inc., Janesville, Wis.

[21] Appl. No.: 08/952,528

[22] PCT Filed: May 9, 1996

[86] PCT No.: PCT/US96/06437

§ 371 Date: Nov. 7, 1997

§ 102(e) Date: Nov. 7, 1997

[87] PCT Pub. No.: WO96/35896

PCT Pub. Date: Nov. 14, 1996

Related U.S. Application Data

[63] Continuation-in-part of application No. 08/437,814, May 9, 1995, abandoned.

[51] Int. Cl.⁶ ................................................. F16K 11/02
[52] U.S. Cl. ........................................ 137/625.48; 141/98
[58] Field of Search ........................... 137/625.4, 625.48, 137/589; 141/98

[56] References Cited

U.S. PATENT DOCUMENTS

| | | | |
|---|---|---|---|
| 4,423,741 | 1/1984 | Levy | 128/768 |
| 4,535,802 | 8/1985 | Robertson | 137/322 |
| 4,691,737 | 9/1987 | Sebo | 137/625.26 |
| 4,911,211 | 3/1990 | Andersen | 141/7 |

*Primary Examiner*—John Fox
*Attorney, Agent, or Firm*—Michael Best & Friedrich LLP

[57] ABSTRACT

A power steering fluid system is filled through port (56) in the direction of normal circulation of the fluid (24).

10 Claims, 3 Drawing Sheets

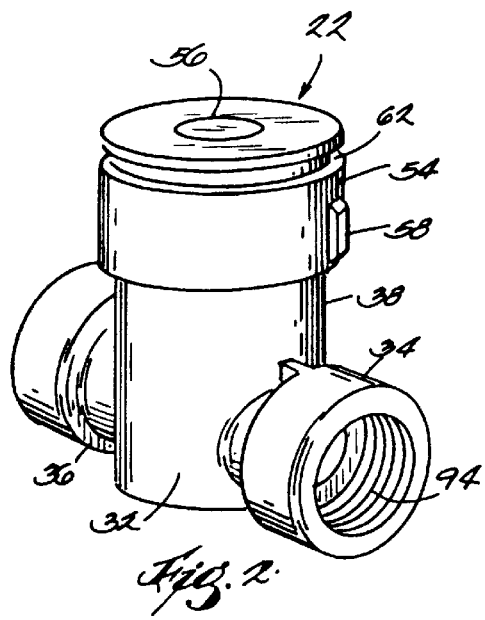
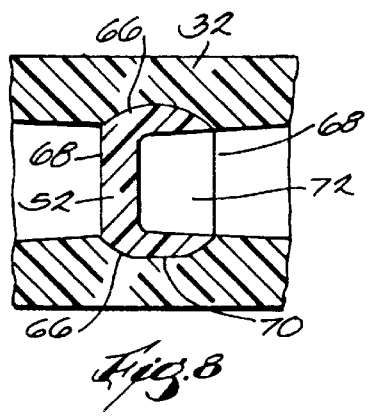
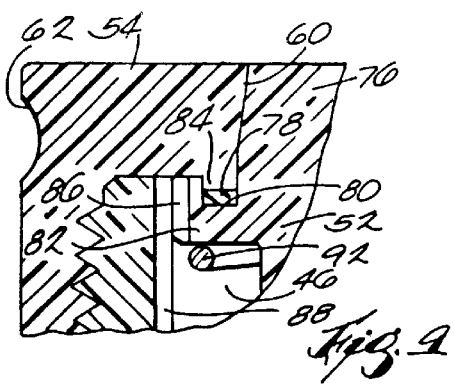
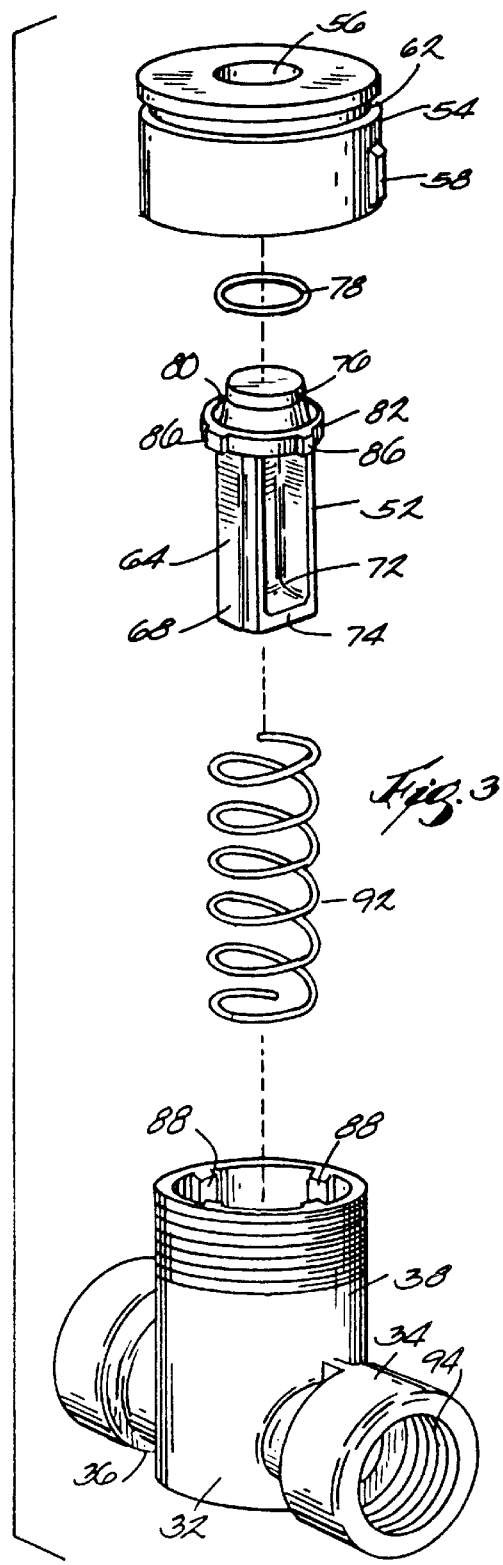

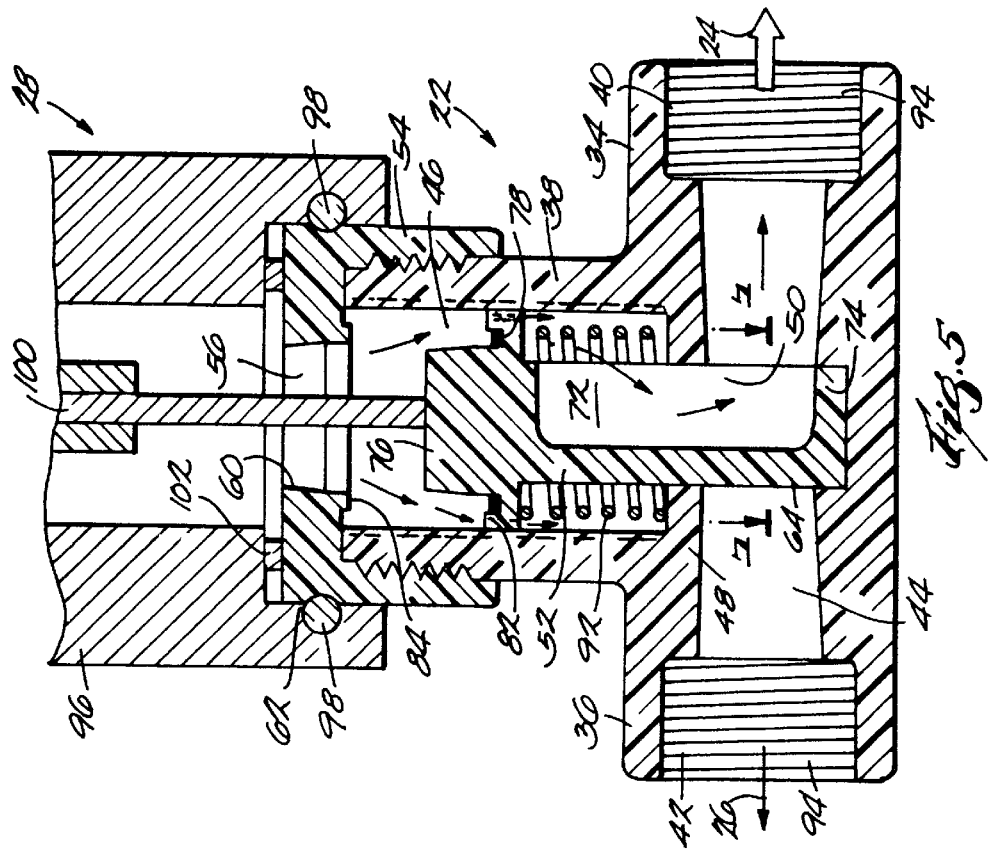
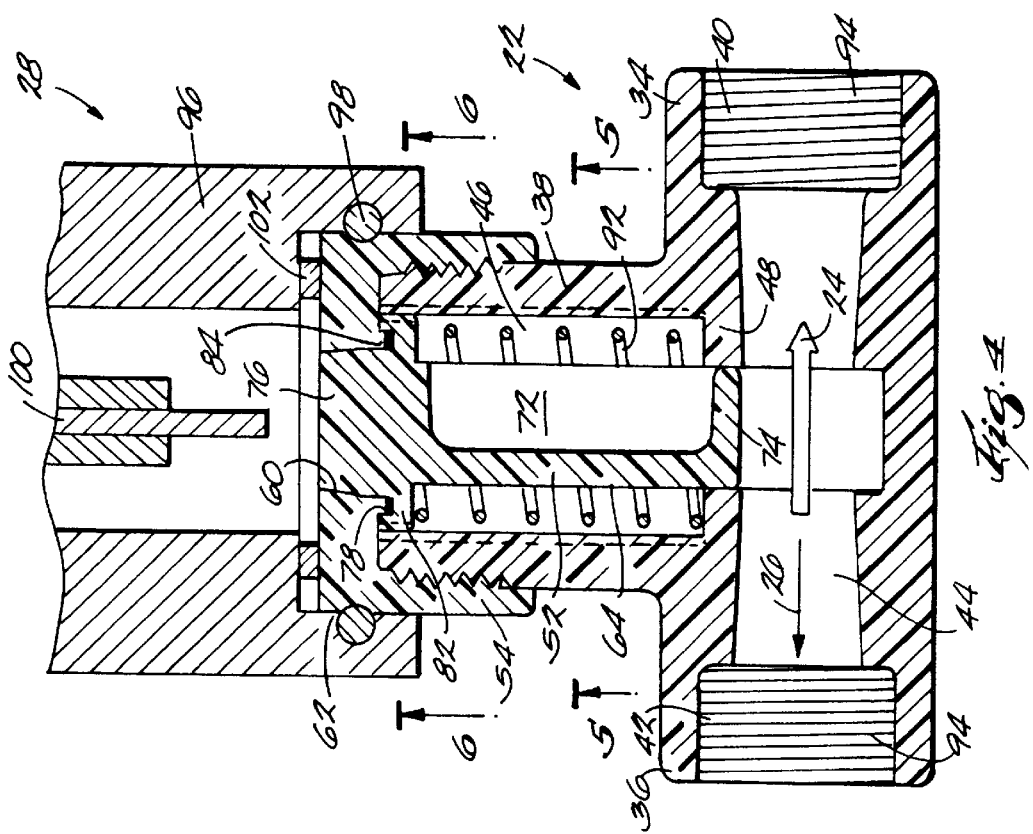

METHOD AND VALVE FOR FILLING FLUID SYSTEM

REFERENCE TO RELATED APPLICATION

This is a continuation-in-part of commonly-assigned U.S. patent application Ser. No. 08/437,814, filed May 9, 1995, now abandoned.

FIELD OF THE INVENTION

The present invention generally relates to the field of fluid systems, such as hydraulic power or cooling systems. More specifically, the present invention relates to methods and devices for filling closed loop fluid systems with fluid.

BACKGROUND OF THE INVENTION

Fluid systems are used in a wide variety of applications, particularly in the automotive field. For example, fluid systems are used to transfer power (e.g., automotive brakes), boost power (e.g., automotive power steering), and provide cooling (e.g., automotive radiator system or air conditioner). Fluid systems use a working fluid to transfer forces used in such applications. When in the confines of a closed loop fluid system, the working fluid is under pressure and is in a liquid form.

When filling a fluid system with a working fluid for the first time, it is important to remove as much air from the system as possible. Traditionally, initial working fluid introduction is performed by first evacuating air from the system through a port using a vacuum or similar device. The working fluid is then introduced into the system under low pressure (e.g., under its own weight). With a standard automotive power steering system, the evacuation and fill procedure can take up to about two minutes or more.

During the filling process, air can sometimes become trapped within the system. In most closed loop fluid systems, the presence of air in the system is undesirable. For example, in power steering systems air can cause the pump motor to burn out prematurely, and in brake systems air can cause decreased responsiveness of the brakes. In an attempt to remove trapped air from the system, a newly-filled system is typically "burped" by running the system through a number of cycles to force air trapped in the system to be brought to the surface of the fluid reservoir. The system is then topped off with an additional amount of working fluid to replace the air that has been removed. It is not uncommon for it to take 4 to 6 hours to adequately burp a closed loop fluid system.

SUMMARY OF THE INVENTION

An objective of the present invention is to decrease the time required to fill a fluid system with working fluid. Another objective of the present invention is to reduce the amount of air trapped within a fluid system during the filling process, thereby eliminating the need to burp the system.

To accomplish these objectives, the present invention provides a method for filling a fluid system wherein working fluid is injected unidirectionally into the system while air is simultaneously being removed. More specifically, the working fluid is injected through a fill port under pressure such that it flows through the system in one direction, thereby forcing the air out of the system. This inhibits the possibility of air being trapped within the system between volumes of working fluid. In one aspect, the method includes the steps of pressurizing fluid in preparation for injection into the fluid system, and injecting the pressurized fluid into the fluid system in a substantially unidirectional flow. For example, the fluid system can define a closed fluid path having first and second opposing directions, and the injecting step can include the steps of injecting the pressurized fluid in the first direction, and inhibiting flow of pressurized fluid in the second direction. By virtue of this method, there is no need to evacuate the air from the system prior to adding working fluid. As a result of this method, total fill time has been reduced to less than 30 seconds. Furthermore, there is no need to burp the system.

In one embodiment, the method further includes the step of removing old fluid from the system simultaneously with the injecting step. Preferably, the injecting step includes injecting the pressurized working fluid into the fluid system at a fill port, -and the removing step includes removing old fluid from the fluid system at an exhaust port separate from the fill port. For example, the removing step can include removing old fluid from the fluid system at an exhaust port positioned closer in the second direction from the fill port than in the first direction. In this manner, by injecting working fluid in the first direction, most of the fluid path will be filled with working fluid.

In another embodiment, the fluid system includes a fill port that is blocked from communication with a fluid path of the fluid system under normal operation of the fluid system. In this embodiment, the injecting step includes the steps of providing communication between the fill port and the fluid path, injecting fluid through the fill port into the fluid path and, after the injecting step, blocking communication between the fill port and the fluid path. For example, the fluid path can include a first orifice opening in a first direction from the fill port and a second orifice opening in a second direction from the fill port, and the providing step includes the steps of providing communication between the fill port and the first orifice and inhibiting communication between the first orifice and the second orifice, such that fluid injecting through the fill port travels primarily through the first orifice (i.e., substantially unidirectionally). Preferably, the providing and inhibiting steps occur substantially simultaneously.

To achieve the desired substantially unidirectional flow in the system, the present invention also provides a valve assembly for facilitating injection of fluid into a fluid system. The valve assembly includes a housing having a fill port, a first orifice, and second orifice. A valve member is positioned within the housing and is movable relative to the housing between a closed position, in which the fill port is blocked from communication with the first and second orifices and the first orifice and second orifice communicate, and an open position, in which the fill port communicates with the first orifice and the second orifice is substantially blocked from communication with the first orifice. The valve assembly further includes means for biasing the valve member toward the closed position.

In one embodiment, the valve assembly further includes a seal (e.g., a gasket) positioned between the valve member and the housing when the valve member is closed. The valve member can include a plug positioned within the fill port when the valve member is in the closed position. Preferably, the fill port has a tapered inner surface for guiding the plug into the fill port.

In another embodiment, the valve assembly further includes means for supporting the valve member within the housing while allowing fluid flow around the valve member. For example, the supporting means can include at least one radially extending projection position between the valve member and the housing. The projection can be secured to the valve member or the housing, or a projection can be provided for both.

The valve assembly can be used in conjunction with an injector nozzle positionable in abutting relation with the valve assembly adjacent the fill port. The nozzle includes an actuating member that moves the valve member from the closed position to the open position when the nozzle is engaging the valve assembly. Preferably, the valve assembly is configured to facilitate engagement of the nozzle with the valve assembly (e.g., by a circumferential groove).

The present invention is particularly applicable to power steering fluid systems having fluid travelling through a fluid path having first and second directions. Such a system would include a fluid pump positioned to pressurize fluid in the fluid path, a steering mechanism (e.g., a gear box) positioned to receive pressurized fluid in the fluid path, and a valve assembly for injecting fluid into the fluid path in substantially only the first direction. A valve assembly similar to that described above could be used.

The power steering fluid system can further include a fluid reservoir in operative communication with the fluid path. Preferably, the fluid reservoir is positioned adjacent to and in the second direction from the valve assembly. In this regard, the valve assembly is designed so that a small amount of fluid will flow in the second direction when injecting fluid in the first direction in order to fill the fluid path between the valve assembly and the fluid reservoir.

BRIEF DESCRIPTION OF THE DRAWINGS

FIG. 2 is a perspective view of a valve embodying the present invention.

FIG. 3 is a perspective assembly view of the valve illustrated in FIG. 2.

FIG. 4 is a vertical section view taken along line 4—4 in FIG. 2, with the plunger in a closed position.

FIG. 5 is the vertical section view of FIG. 4 with the plunger in an open position.

FIG. 8 is a partial section view taken along line 8—8 in FIG. 5.

FIG. 9 is an enlarged partial section view taken along line 9—9 in FIG. 4.

DETAILED DESCRIPTION

Figures 6, 7:
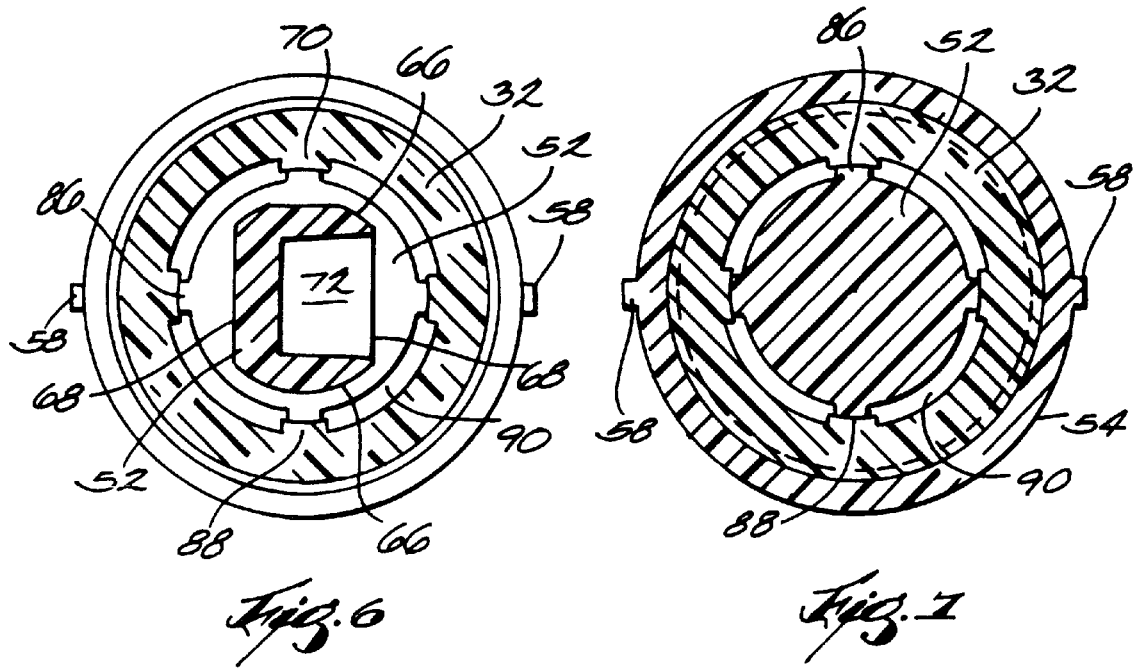
FIG. 6 is a horizontal section view taken along line 6—6 in FIG. 4.
FIG. 7 is a horizontal section view taken along line 7—7 in FIG. 4.
Figure 1:
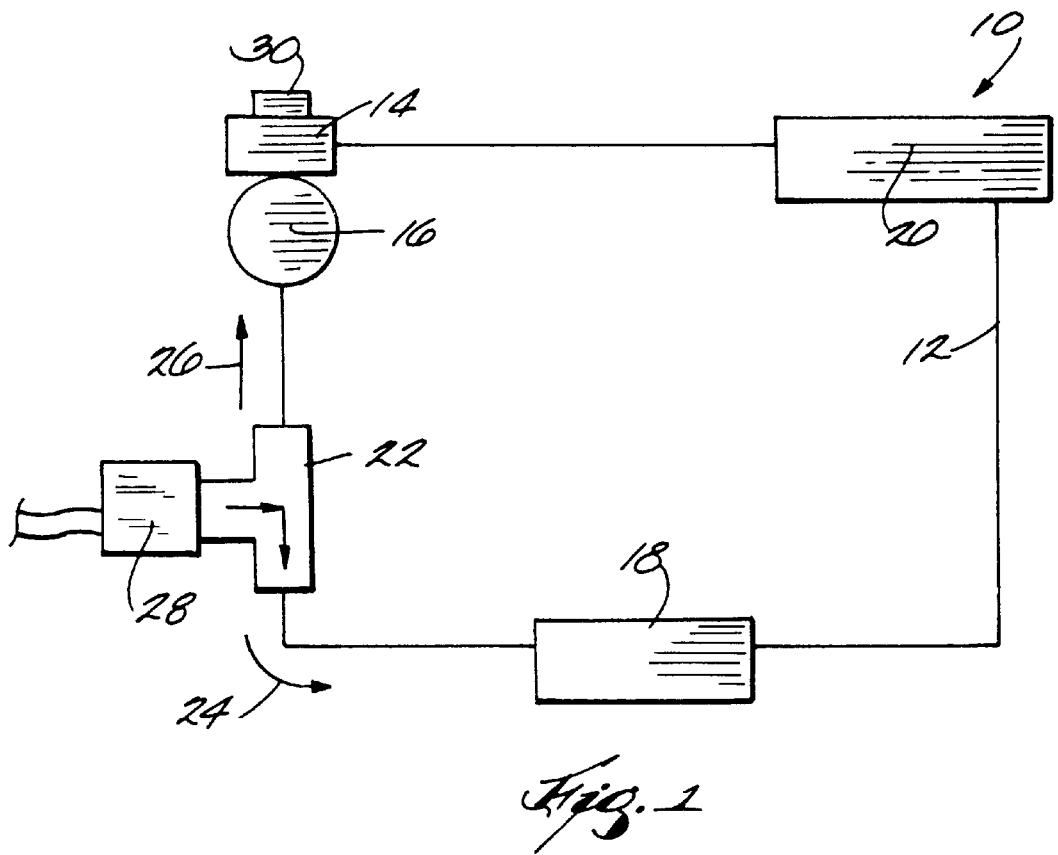
FIG. 1 is a schematic of a power steering fluid system embodying one aspect of the present invention.

FIG. 1 schematically illustrates a power steering fluid system 10 having fluid travelling through a fluid path 12. The system 10 includes a fluid reservoir 14, a fluid pump 16 positioned to pressurize fluid in the fluid path 12, a steering mechanism in the form of a gear box 18 positioned to receive pressurized fluid in the fluid path 12, a hydraulic boost 20 and a valve assembly 22 designed to inject fluid into the fluid system 10. The valve assembly 22 is designed to inject fluid in primarily a first direction 24, but will also inject some fluid in a second direction 26. Working fluid is provided to the valve assembly 22 by an injector nozzle 28, which is provided with pressurized working fluid from an external source (not shown). In the illustrated embodiment, the valve assembly 22 is positioned adjacent to the fluid reservoir 14 and the pump 16. The fluid reservoir 14 includes a bleed valve 30 for bleeding off air when working fluid is injected into the system 10. By using the valve assembly 22, fluid injected into the system 10 will travel primarily in the first direction 24 to thereby force air out of the system 10 through the bleed valve 30.

The method of filling the fluid system 10 with working fluid utilizing the above-described valve assembly 22 is initiated by pressurizing working fluid in preparation for injection into the fluid system 10. The pressurized working fluid is then be injected into the fluid system 10 in a substantially unidirectional flow (e.g., in the first direction 24). During the injecting step, fluid flow in the second direction 26 is inhibited. While injecting working fluid, air is withdrawn through an exhaust port, such as the air bleed. It is noted that the air bleed is positioned closer in the second direction 26 from the valve assembly 22 than in the first direction 24. In this manner, substantially the entire volume of the fluid path 12 will be filled with working fluid. The volume of the fluid path 12 between the bleed valve 30 and the valve assembly 22 is filled by allowing a small amount of injected working fluid to travel in the second direction 26 from the valve assembly 22.

It is also contemplated that the above valve assembly 22 could be used to change fluid in a fluid system 10. That is, when old working fluid becomes contaminated, it could be forced out of the system 10 by the pressure from the new working fluid being provided by the valve assembly 22. The old working fluid would be withdrawn through the bleed valve 30 or similar device.

A valve assembly 22 embodying the present invention is illustrated in FIGS. 1–6. The valve assembly includes a housing 32 (FIGS. 4 and 5) that is a generally T-shaped member having first and second opposed branches 34,36 and a fill branch 38 extending perpendicularly to the first and second branches 34,36. The first branch 34 extends in the first direction 24 and the second branch extends in the second direction 26. The first and second branches 34,36 are hollow, thereby forming first and second orifices 40,42 and a passageway 44 extending between the orifices. Similarly, the fill branch 38 is hollow, thereby forming a fill chamber 46. The fill chamber 46 and the passageway 44 are partially separated by an annular shelf 48 having a shelf opening 50 for allowing a valve member, in the form of a plunger 52, to extend through the shelf 48.

A cap 54 defining a fill port 56 is threaded to the housing 32 adjacent one end of the fill chamber 46 to hold the plunger 52 within the housing 32. The cap 54 includes means for enhancing engagement of the cap 54 by a user's hand. In the illustrated embodiment, the enhancing means includes two tabs 58 (FIGS. 3, 5 and 6) positioned on opposing sides of the outer surface of the cap 54. The tabs 58 improve engagement of the cap 54 by a user's fingers, thereby facilitating attaching the cap 54 to and detaching the cap 54 from the housing 32. The portion of the cap 54 that forms the fill port 56 is slightly tapered, with the wider portion facing the fill chamber 46. This tapered portion 60 (FIG. 8) provides a lead in for facilitating insertion of the plunger 52 into the fill port 56. The cap 54 further includes a circumferential groove 62 (FIGS. 2 and 8) for facilitating attachment of the injector nozzle 28 to the valve assembly 22.

The plunger 52 is movably positioned within the fill chamber 46 to selectively open and close communication between the fill chamber 46 and the passageway 44, and to selectively open and closed communication between the first and second orifices 40,42. The plunger 52 includes a shaft portion 64 positioned to move through the shelf opening 50. The shaft portion 64 has a cross section that substantially matches the cross section of the shelf opening 50 to thereby provide stable support between the shelf 48 and the plunger 52. The cross section of the shaft portion 64 (FIG. 6) is formed by two opposing arcuate segments 66 separated by two opposing straight segments 68. One of the arcuate segments 66 includes a flattened portion 70 to ensure that the plunger 52 is properly oriented within the shelf opening 50. The shaft portion 64 includes a longitudinal recess 72 (FIGS. 3–6) bordered by an end wall 74. The recess 72 facilitates flow of fluid from the fill chamber 46 to the passageway 44 when the plunger 52 is in the open position (FIG. 5). The end wall 74 substantially prevents flow of fluid between the fill chamber 46 and the passageway 44 when the plunger 52 is in the closed position (FIG. 4), and reduces turbulence that may be caused by the presence of the shelf opening 50 when the plunger 52 is in the closed position.

It should be noted that neither the plunger 52 nor the housing 32 includes a fluid tight seal for preventing flow of fluid around the shaft portion 64 of the plunger 52 when the plunger 52 is in the open position (FIG. 4). In fact, the fit between the plunger 52 and the housing 32 in the illustrated assembly is purposely designed to afford some flow, albeit a small amount, around the plunger 52 and toward the second orifice 42 (i.e., in the second direction 26). This design facilitates provision of a small amount of fluid to the fluid path in the second direction 26 from the valve assembly 22 in order to fill the fluid path between the valve assembly 22 and the bleed valve 30.

The plunger 52 includes a tapered plug 76 (FIGS. 5 and 9) that fits within the fill port 56 when the plunger 52 is in the closed position. The plunger 52 further includes means for sealing between the plunger 52 and the fill port 56 when the plunger 52 is in the closed position. In the illustrated embodiment, the sealing means includes a gasket 78 (FIG. 9) in the form of an O-ring. The gasket 78 is positioned within an annular trough 80 formed in a flange 82 extending radially from the tapered plug 76. The trough 80 faces axially toward an annular ridge 84 formed on the cap 54 surrounding the fill port 56. When the plunger 52 is in the closed position, the ridge 84 extends into the trough 80 to compress the gasket 78 and provide the desired seal.

The valve assembly 22 further includes means for supporting the plunger 52 within the fill chamber 46 while allowing fluid flow around the plunger 52. In the illustrated embodiment, the supporting means includes four radially outwardly-extending projections 86 (FIGS. 3 and 7) secured to the flange 82. The projections 86 cooperate with four complementary radially inwardly-extending splines 88 secured to the inner surface of the housing 32 in the fill chamber 46. The splines 88 extend axially along the length of the fill chamber 46 and provide support the projections 86 while the plunger 52 moves between the open and closed positions. Fluid flow around the plunger 52 is provided by the circumferential gap 90 between adjacent projections 86.

Biasing means in the form of a coil spring 92 (FIGS. 3–5) biases the plunger 52 toward the closed position, in which communication between the fill port 56 and passageway 44 is blocked and communication between the first and second orifices 40,42 is open. More specifically, the spring 92 surrounds the shaft portion 54 of the plunger 52. The spring 92 is compressed and has one end supported by the shelf 48 and the other end engaged with the flange 82.

The valve assembly 22 further includes means for connecting the first and second orifices 40,42 to a fluid system. In the illustrated embodiment, the connecting means includes connecting threads 94 (FIGS. 3–5) formed on an inner surface of both the first and second branches 34,36 adjacent the first and second orifices 40,42. The connecting threads 94 are designed to cooperate with threads on corresponding connectors (not shown) that form part of a fluid system into which the valve assembly 22 is to be incorporated.

The injector nozzle 28 (FIGS. 4 and 5) is designed to inject working fluid into the fill port 56 while simultaneously holding the plunger 52 in the open position. The nozzle 28 includes a collar 96 designed to fit over the cap 54. The inner surface of the collar 96 includes detent means for engaging the groove 62 in the cap 54 to provide secure engagement therebetween. In the illustrated embodiment, the detent means includes a plurality of ball detents 98. The injector nozzle 28 further includes an actuating member 100 movable axially relative to the collar 96. The actuating member 100 is movable from a retracted position (FIG. 3), in which the actuating member 100 does not contact the plunger 52, to an extended position (FIG. 4), in which the actuating member 100 contacts and holds the plunger 52 in the open position. A sealing member 102 is attached to the injector nozzle 28 to provide a seal around the fill port when fluid is being provided to the valve assembly 22.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of filling a fluid system with fluid, comprising the steps of:

pressurizing fluid in preparation for injection into the fluid system; and injecting the pressurized fluid into the fluid system in a substantially unidirectional flow.

2. A method as claimed in claim 1, wherein the fluid system defines a closed path having first and second opposing directions, and wherein said injecting step includes the steps of:

injecting the pressurized fluid in the first direction; and inhibiting flow of pressurized fluid in the second direction.

3. A method as claimed in claim 1, further comprising the step of removing old fluid from the system simultaneously with said injecting step.

4. A method as claimed in claim 3, wherein said injecting step includes injecting the pressurized fluid into the fluid system at a fill port, and wherein said removing step includes removing old fluid from the fluid system at an exhaust port separate from the fill port.

5. A method as claimed in claim 4, wherein said removing step includes removing old fluid from the fluid system at an exhaust port positioned closer in the second direction from the fill port than in the first direction.

6. A method as claimed in claim 1, wherein the fluid system includes a fill port that is blocked from communication with a fluid path of the fluid system under normal operation of the fluid system, and wherein said injecting step includes the steps of:

provia communication between the fill port and the fluid path;

injecting fluid through the fill port and into the fluid path; and blocking communication between the fill port and the fluid path after said injecting step.

7. A method as claimed in claim 6, wherein the fill port includes a valve movable from a closed position, where the fill port is blocked from communication with the fluid path, to an open position, where the fill port is in communication with the fluid path, wherein said providing step includes moving the valve from the closed position to the open position, and wherein said blocking step includes moving the valve from the open position to the closed position.

8. A method as claimed in claim 6, wherein the fluid path includes a first orifice positioned in a first direction from the fill port and a second orifice positioned in a second direction from the fill port, and wherein said providing step includes the steps of:

providing communication between the fill port and the first orifice; and inhibiting communication between the first orifice and the second orifice, such that fluid injecting through the fill port travels primarily through the first orifice.

9. A method as claimed in claim 8, wherein said providing and inhibiting steps occur substantially simultaneously.

10. A method as claimed in claim 1, wherein the fluid system defines a closed path having first and second opposing directions, and wherein said injecting step includes the steps of:

injecting the pressurized fluid in the first direction at a first flow rate; and injecting the pressurized fluid in the second direction at a second flow rate that is less than the first flow rate.

* * * * *